(12) United States Patent
Weber

(10) Patent No.: US 6,822,557 B1
(45) Date of Patent: Nov. 23, 2004

(54) ACTION RECOMMENDATION SYSTEM FOR A MOBILE VEHICLE

(75) Inventor: James R. Weber, Lacon, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/669,976

(22) Filed: Sep. 26, 2000

(51) Int. Cl.[7] .................................................. B60Q 1/00
(52) U.S. Cl. ................ 340/425.5; 340/438; 340/457.4; 340/825.36; 340/825.4; 700/29; 700/200; 700/211
(58) Field of Search .......................... 340/425.5, 438, 340/439, 461, 460, 457.4, 988, 7.48, 7.52, 825.36, 825.49; 701/200, 213, 211, 24, 29, 32

(56) References Cited

U.S. PATENT DOCUMENTS

| | | | |
|---|---|---|---|
| 4,125,894 A | 11/1978 | Cashel et al. | 701/102 |
| 4,270,174 A | 5/1981 | Karlin et al. | 701/102 |
| 4,271,402 A | 6/1981 | Kastura et al. | 701/102 |
| 4,751,633 A | 6/1988 | Henn et al. | 340/457.4 |
| 5,050,080 A | 9/1991 | Abe | 701/102 |
| 5,608,632 A | 3/1997 | White | 701/102 |
| 5,794,164 A * | 8/1998 | Beckert et al. | 701/1 |
| 5,819,201 A * | 10/1998 | DeGraaf | 701/208 |
| 5,884,210 A | 3/1999 | Rettig et al. | 701/102 |
| 5,914,654 A | 6/1999 | Smith | 701/115 |
| 5,917,408 A * | 6/1999 | Cardillo et al. | 340/439 |
| 5,968,107 A | 10/1999 | Vogan et al. | 701/102 |
| 5,983,156 A | 11/1999 | Andrews | 701/115 |
| 5,990,805 A * | 11/1999 | Wicks et al. | 340/825.44 |
| 6,018,293 A | 1/2000 | Smith | 340/438 |
| 6,101,381 A * | 8/2000 | Tajima et al. | 455/414 |
| 6,154,658 A * | 11/2000 | Caci | 455/466 |
| 6,157,814 A * | 12/2000 | Hymel et al. | 455/31.1 |
| 6,243,030 B1 * | 6/2001 | Levine | 340/995 |
| 6,282,464 B1 * | 8/2001 | Obradovich | 701/1 |
| 6,330,499 B1 * | 12/2001 | Chou et al. | 701/33 |

OTHER PUBLICATIONS

Terio FleetView brochure retrieved from Internet on Jul. 20, 2000.

* cited by examiner

*Primary Examiner*—Davetta W. Goins
(74) *Attorney, Agent, or Firm*—Eric Bram; Larry Cain; W Bryan McPherson

(57) ABSTRACT

Specific advertisements and other information can be communicated to the user of a mobile vehicle depending on the vehicle's position, vehicle or user characteristics, or other vehicle-specific data.

50 Claims, 3 Drawing Sheets

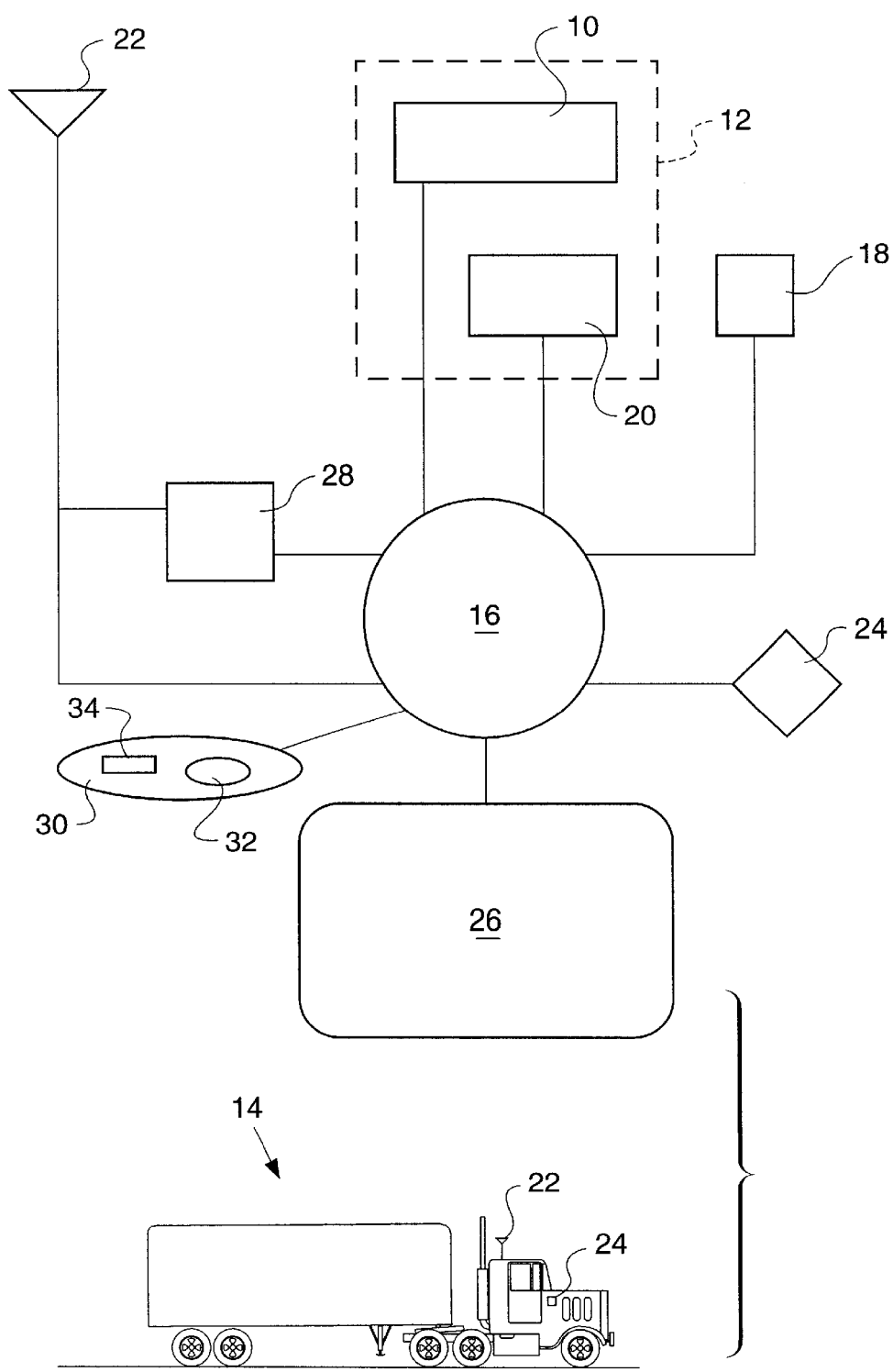

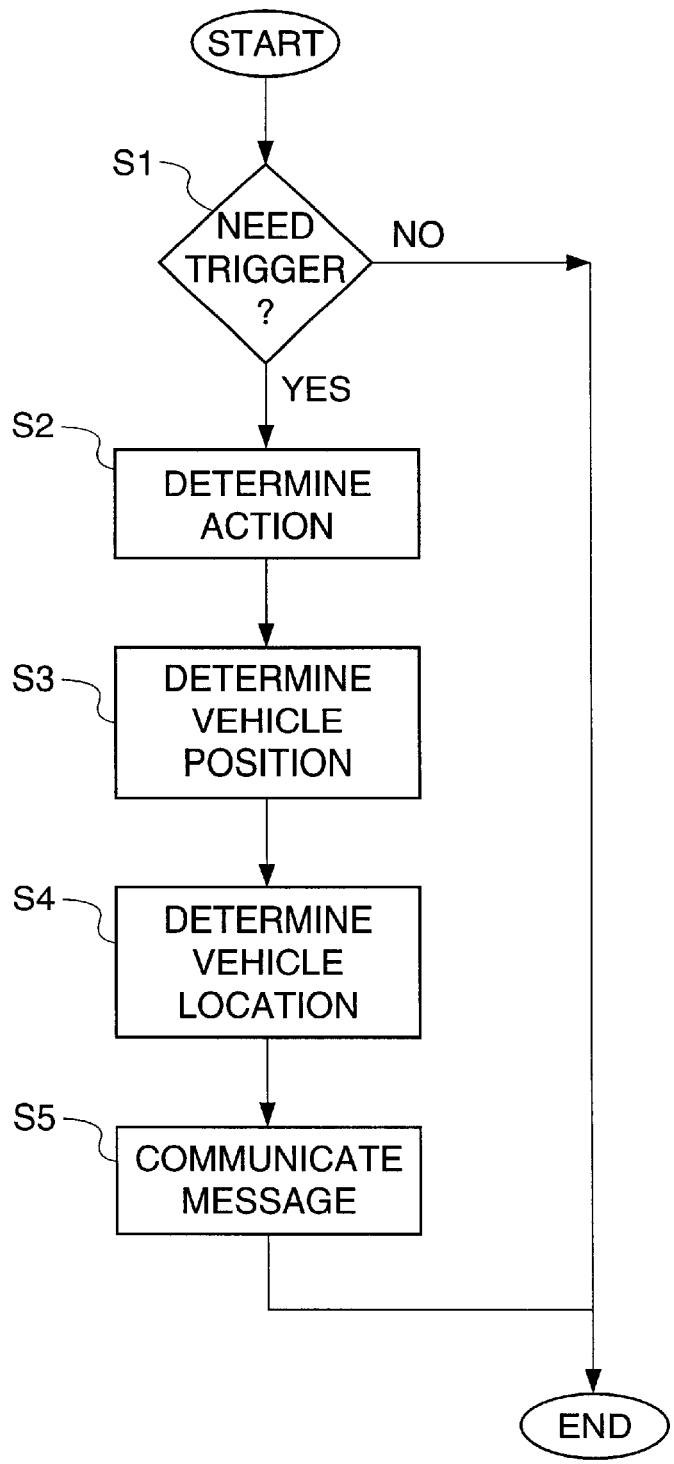

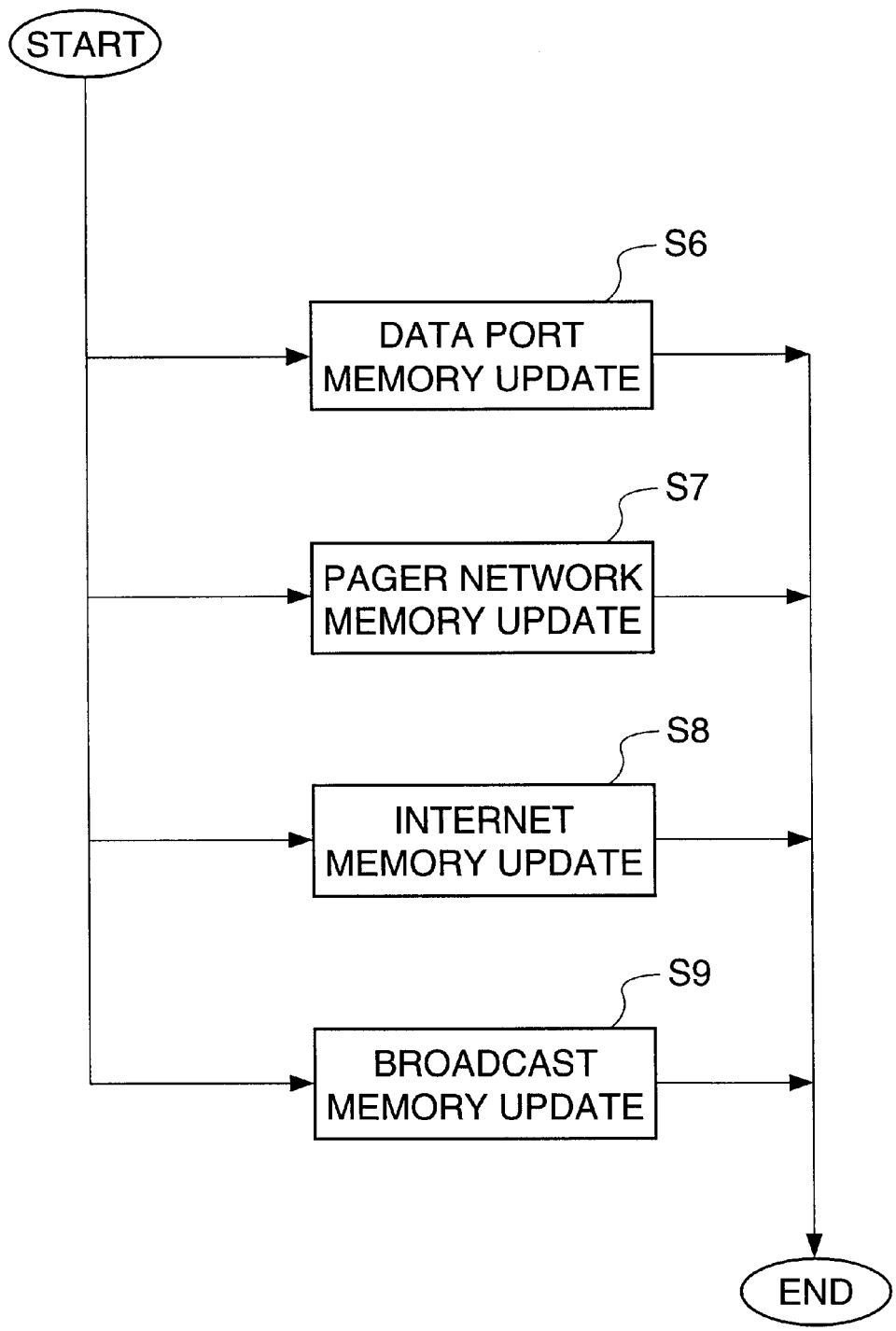

1

ACTION RECOMMENDATION SYSTEM FOR A MOBILE VEHICLE

TECHNICAL FIELD

This invention is directed to advertising and information display systems, and more particularly to advertising, diagnostic, and informative displays for mobile vehicles.

BACKGROUND ART

Owners and operators of trucks and other mobile vehicles often travel to areas with which they are unfamiliar. Even in areas with which they are familiar, there are often nearby resources for obtaining goods and services for their vehicles, and for other purposes, of which they are unaware.

Conversely, dealers of trucks and other automotive products and services incur enormous costs in advertising their products. Unfortunately, much of this expense is wasted when a large percentage of the audience exposed to their radio, print, or other media-based advertisements may have no need or desire for the product or service advertised, because they do not own the particular type of vehicle for which the product or service is available, or their vehicle does not currently need the particular product or service, or because they are not located near (or do not know they're located near) a convenient source for the advertised product or service.

It would be advantageous for vehicle owners and operators to be made aware of potential needs that their vehicle might require, and also of nearby resources for satisfying that need. It would also be mutually advantageous for vehicle manufacturers and/or dealers, as well as for owners and operators, if a vehicle occupant could be alerted to these possible needs by means of an advertisement or other message directing the vehicle operator to a particular service center, store, or other resource in the vicinity of the vehicle.

Conventional systems are available that can tell the driver of the vehicle his position, and there are systems that can provide maps to desired destinations. However, these systems require inputs from the driver or vehicle operator as to what destination or type of destination is desired. Conventional systems are available that alert a driver if there is a problem with his vehicle. And of course, conventional systems are available to direct advertising at vehicle drivers (e.g., billboards, commercial radio, etc.).

However, no systems are available that choose and communicate advertising or advisory messages to a driver based on some physical attribute of the vehicle (e.g., type of vehicle, condition of vehicle, etc.) and/or the vehicle's position. Such a system would allow precise targeting of advertisements and/or advisory messages.

The invention is directed toward addressing one or more of the above concerns.

DISCLOSURE OF THE INVENTION

In one aspect of the invention, A method of operating an onboard electronic control module (ECM) for a mobile vehicle comprises determining vehicle status data representative of a characteristic of the vehicle; determining a recommended course of action based on the vehicle status data; and communicating the recommended course of action to an occupant of the vehicle in an advertisement message, including at least one of a suggestion to obtain a specific commercial brand of merchandise, a suggestion to obtain merchandise from a specific vendor, and a suggestion to obtain a service from a specific merchant.

In another aspect of the invention, an action recommendation system for a mobile vehicle comprises an ECM; a user interface capable of receiving a message from the ECM and one of displaying and announcing the message to an occupant of the vehicle; a memory accessible by the ECM; and a program in the memory. The program is accessible and operable by the ECM to determine a vehicle status characteristic based on a vehicle status input, to determine a recommended course of action based on the vehicle status characteristic, and to communicate the recommended course of action to the occupant via the message. The recommended course of action communicated to the occupant includes at least one of obtaining a specific commercial brand of merchandise, obtaining merchandise from a specific vendor, and obtaining a service from a specific merchant.

In yet another aspect of the invention, a method of operating an ECM for a mobile vehicle comprises determining vehicle status data representative of a characteristic of the vehicle; determining position data representative of a geographical position of the vehicle; determining a recommended course of action based on the vehicle status data and the position data; and communicating the recommended course of action to an occupant of the vehicle.

In still another aspect of the invention, an action recommendation system for a mobile vehicle comprises an ECM; a user interface capable of receiving a message from the ECM and one of displaying and announcing the message to an occupant of the vehicle; a memory accessible by the ECM; and a program in the memory. The program is accessible and operable by the ECM to determine a geographical position of the vehicle based on a position input, to determine a vehicle status characteristic based on a vehicle status input, to determine a recommended course of action based on the vehicle status characteristic and the geographical position, and to communicate the recommended course of action to the occupant via the message.

BRIEF DESCRIPTION OF THE DRAWING FIGURES

The invention is described herein with reference to the drawing of an embodiment of the invention, in which:

FIG. 1 is a functional flowchart representative of data flow connections between modules utilizing an action recommendation system according to the invention;

FIG. 2 is a logical flowchart representing steps in performing an embodiment of the method of the invention; and FIG. 3 illustrates possible data update steps for one or more embodiments of the method of the invention.

BEST MODE FOR CARRYING OUT THE INVENTION

In one embodiment of the invention, with reference to FIG. 1, a display 10 of a user interface 12 in a mobile vehicle 14 can receive or display 10 a message from an ECM 16 to an occupant of the vehicle 14. In other embodiments a speaker 18 in addition to or in place of the display 10 could be used to audibly announce the message. The user interface 12 can also include one or more input devices 20, for example a keyboard, touch pad, mouse, microphone, etc., for allowing the occupant to input data to the ECM 16.

The ECM 16 can receive data from the user interface 12. The ECM 16 can also receive data from a receiver/transceiver 22, a data input port 24, an engine 26 of the vehicle 14, and/or a vehicle position detecting device 28 for example. The ECM 16 also communicates with a memory

30. The memory 30 includes a database 32 containing resource data. A program for operating the ECM 16, a computer software program for example, can also be stored in the memory 30.

FIG. 2 illustrates a method for operating the ECM 16 with a computer program for example embedded in a portion of the memory 30 according to one embodiment. Step S1 is to determine that a need trigger has occurred. No further action takes place until a need trigger is detected. Once the need trigger is detected, step S2 is to determine a recommended course of action depending on the nature of the event trigger. Step S3 is to determine a vehicle position. Step S4 is to determine a preferred location (if any) for accomplishing the recommended course of action, based on the vehicle position. Step S5 is to communicate to the vehicle occupant a message indicative of the recommended course of action and the preferred location (if any) for accomplishing the recommended course of action. The order of steps can be varied. S2 can be performed after S3 for example.

Periodically, the memory 30 can be managed with updating or other functions, which may be performed in the alternative or concurrently. These functions are now described with reference to FIG. 3, which shows a sample order for performing functions. Step S6 is to update the memory 30 with information from the data input port 24 on the vehicle 14. Step S7 is to update the memory 30 with information received through the receiver/transceiver 22 via a pager network. Step S8 is to update the memory 30 with information received via the receiver/transceiver 22 via the Internet. Step S9 is to update the memory 30 with information received through the receiver/transceiver 22 via transmitting or broadcasting stations that supply data to systems utilizing the invention.

The above functions are described in more detail below.

INDUSTRIAL APPLICABILITY

The methods and systems described herein may be used to perform a wide variety of functions. For example, a vehicle operator could be alerted when a repair or a scheduled maintenance is needed or recommended. Ideally, the alerts, advertisements, and other messages can be delivered automatically when needed, based on time, engine status, and/or other changing conditions, instead of requiring the operator to specifically request them or initiate additional information input.

Individualized advertisements, a preferred dealer for performing the recommended repair or maintenance for example, could be presented to a driver. The address to the nearby such dealer, even possibly including driving directions to that dealer, phone number, etc., could be given. In alternate embodiments of the invention, geographical position of the vehicle need not be determined, or if it is determined it need not be used. These embodiments could be used to advertise a particular brand of merchandise or service obtainable nationwide for example.

To illustrate, an advertisement may be communicated to the vehicle operator when a low fuel, oil, or other engine fluid level is detected, advising the operator that it is time to buy more, and suggesting a particular brand for purchase. For another example, an advertisement may be communicated to the vehicle operator when it is determined that the vehicle is a certain age or has been operated a certain number of miles, suggesting the operator should go to a particular company's servicing center to have the vehicle serviced.

Any number of such advertisements tailored to the specific vehicle, changing characteristics of the vehicle, and/or location of the vehicle can be easily imagined. In all these cases, these advertisements could also include special offers, discounts, or other inducements to purchase a service or merchandise from a particular merchant or vendor.

These systems can be used with any mobile vehicle 14, an automobile or highway truck for example, that can be expected to travel long distances. They can also be used with a short-range vehicle, an off-road vehicle or earthmoving machine for example, expected to stay within a small distance from a particular location. In such a case location-specific resource data, i.e., information regarding products and services, can alternatively be provided as above, or input as desired, or even implanted in the memory 30 at time of manufacture.

Generally, the ECM 16 will incorporate an onboard computer for performing the method, which may be stored in a portion of the memory 30. Alternatively, the method may be performed partially or entirely by an off-site or central computer facility. In that case, the vehicle status data could be transmitted to the computer facility via the receiver/transceiver 22 or Internet for example, and the computer facility could likewise transmit the message to the user interface 12 in the vehicle 14.

While the invention could be used with no direct user input, user-specific information including user preferences and/or special needs could be input via the input device 20 (or embedded in the memory 30 when the system is installed in the vehicle 14) to be used in determining the recommended course of action and/or the preferred location.

For example, a user might input data specifying a certain class or other criterion of a hotel for lodging, or particular brands of fuel and/or vehicle replacement parts, or preferred locations, or even trade-off preferences, such as how important product price is compared with distance to be traveled. Home location or ultimate destination for a particular trip could be input as well, so the ECM 16 could choose a preferred location based on expected travel routes, instead of or in addition to present location. Thus, the vehicle's "geographical position" determined might be an expected instead of and/or in addition to a current location.

The need trigger could be the result of inputs from the engine 26, transmission, electronics system, fuel system, and/or other systems associated with the vehicle. For example, determining the need trigger (S1) could include detection of an imminent need for replacement or evidence of wear of a particular part, or time or mileage since a particular part was installed, or an indication that a particular engine 26 fluid has reached a low level, or even a determination, from physiological feedback or driving performance for example, that a driver is becoming fatigued and should obtain lodging. Other vehicle-specific characteristics could be used as well, for example information regarding the type of vehicle engine 26, vehicle options, other onboard equipment, or even personal data regarding the vehicle owner or operator.

Determining the recommended course of action (S2) is accomplished by comparing the nature of the need trigger against a list of preselected courses of action for that need. Determining the vehicle position (S3) is accomplished by input from the GPS, preprogrammed position data, and/or user input via the user interface 12 for example.

Determining the preferred location (S4) for accomplishing the recommended course of action is accomplished by matching the resource data in the database 32 against the recommended course of action. A database 32 entry for a specific resource could specify what needs can be satisfied and/or what courses of action may be accomplished at that location for example. In this way possibilities for the preferred location can be selected, and a final preferred location or list of preferred locations can be chosen for example based on the geographical a position (current or expected) and any user-specific information or other preferences, which can also be stored in the memory 30.

Finally, the ECM 16 constructs a message for informing the user of the need, the recommended course of action, and/or the preferred location, and sends the message (S5) to the user interface 12 for visual, auditory, or even tactile communication. The message can be in the form of an advertisement. Accordingly, the recommended course of action can include a suggestion to purchase a specific commercial brand of merchandise to meet the need, and/or a suggestion to obtain a service from a specific merchant to meet the need. Alternatively, the message can be in non-advertisement form, providing general advice and/or directions to the vehicle occupant for meeting the need.

Merchants may load updated resource data via (S6) the input port 24 when the vehicle 14 arrives for maintenance or product installation for example. Updated resource data may also be received (and the resource data updated) periodically, or on demand, from (S7) a paging network, from (S8) the Internet, from (S9) broadcasting stations, etc.

The invention is not limited to the disclosed embodiments. For example, the receiver/transceiver 22 can be a single device or a number of receiver and/or transmitter combinations for the same mobile vehicle 14. For example, there may be a separate antenna for receiving GPS data, and another for receiving updated resource data. Of course, the operation can be used with no outgoing transmissions, in which case only an antenna or antennas are needed if necessary to obtain vehicle position data.

Accordingly, while the invention has been illustrated and described in detail in the drawings and foregoing description, such illustration and description are to be considered illustrative or exemplary and not restrictive; other variations to the disclosed embodiments can be made by those skilled in the art while practicing the claimed invention from a study of the drawings, the disclosure, and the appended claims.

What is claimed is:

1. A method of operating a mobile vehicle, comprising:
   determining vehicle status data representative of a characteristic of the vehicle;
   determining a recommended course of action based on the vehicle status data;
   establishing an advertisement message in response to said recommended course of action; and
   communicating the recommended course of action to an occupant of the vehicle in the advertisement message, including at least one of a suggestion to obtain a specific commercial brand of merchandise, a suggestion to obtain merchandise from a specific vendor, and a suggestion to obtain a service from a specific merchant.

2. The method of claim 1, wherein the vehicle status data is determined automatically, and the recommended course of action is determined and communicated automatically.

3. The method of claim 2, including determining a need based on the vehicle status data, and determining the recommended course of action based on the need.

4. The method of claim 3, wherein the need represents mechanical repair of the vehicle.

5. The method of claim 3, wherein the need represents mechanical maintenance of the vehicle.

6. The method of claim 3, including automatically determining position data representative of a geographical position of the vehicle, and wherein determining the recommended course of action is based on the position data as well as on the vehicle status data.

7. The method of claim 6, including:
   accessing a database containing resource data representative of a plurality of respective locations where the recommended course of action may be accomplished;
   choosing a preferred location from among said respective locations by comparing the resource data with the geographical position of the vehicle; and
   communicating information concerning the preferred location to the occupant of the vehicle.

8. The method of claim 7, wherein the preferred location is chosen based on proximity of the geographical position of the vehicle compared with the plurality of respective locations.

9. The method of claim 7, wherein the database is maintained in on onboard memory.

10. The method of claim 9, including updating the database via a data input port on the vehicle.

11. The method of claim 9, including updating the database via a pager network.

12. The method of claim 9, including updating the database via the Internet.

13. The method of claim 7, wherein the database is maintained at a central offboard computer location.

14. The method of claim 7, wherein the database is accessed via the Internet.

15. The method of claim 3, including:
   determining one of personal data and personal preferences provided by an operator; and
   determining a need based on the personal data, and determining the recommended course of action based on the need.

16. The method of claim 3, wherein the vehicle status data comprises results of diagnostic testing of an engine of the vehicle.

17. The method of claim 6, including determining the position data from an earth orbiting satellite global positioning system.

18. An action recommendation system for a mobile vehicle, comprising:
   an electronic control module (ECM);
   a user interface capable of receiving an advertisement message from the ECM and one of displaying and announcing the message to an occupant of the vehicle;
   a memory accessible by the ECM; and
   a program in the memory, the program being accessible and operable by the ECM to determine a vehicle status characteristic based on a vehicle status input, to determine a recommended course of action based on the vehicle status characteristic, establish said advertisement message in response to said recommended course of action; and to communicate the recommended course of action to the occupant via the message,
   wherein the advertisement message communicated to the occupant includes at least one of obtaining a specific commercial brand of merchandise, obtaining merchandise from a specific vendor, and obtaining a service from a specific merchant.

19. The action recommendation system of claim 18, wherein:
   the program is operable by the ECM to determine a geographical position of the vehicle based on a position input; and determining the recommended course of action is based on the geographical position as well as on the vehicle status characteristic.

20. The action recommendation system of claim 19, wherein the ECM:
   accesses a database in the memory containing resource data representative of a plurality of respective locations where the recommended course of action may be accomplished;
   chooses a preferred location from among said respective locations by comparing the geographical position of the vehicle with the resource data; and
   communicates information concerning the preferred location to the occupant via the message.

21. The action recommendation system of claim 20, including a data input port on the vehicle for inputting data into the memory.

22. The action recommendation system of claim 20, including a receiver for receiving, from an offboard source, updates of the resource data for updating the database.

23. A method of operating an onboard electronic control module (ECM) for a mobile vehicle, said mobile vehicle having a plurality of components such as at least an engine, transmission, electronic system, a fuel system and other systems each having a specific brand, comprising:
   determining vehicle status data representative of a characteristic of at least one of said components of the vehicle;
   determining position data representative of a geographical position of the vehicle;
   determining a recommended course of action based on the vehicle status data and the position data; and
   communicating the recommended course of action to an occupant of the vehicle in an advertisement message designating a suggestion to obtain a specific commercial brand of merchandise, a suggestion to obtain merchandise from a specific vendor, and a suggestion to obtain a service from a specific merchant.

24. An action recommendation system for a mobile vehicle, said mobile vehicle having a plurality of components such as at least a engine, transmission, electronic system, a fuel system and other systems each having a specific brand, comprising:
   an electronic control module (ECM);
   a user interface capable of receiving an advertisement message from the ECM and one of displaying and announcing the message to an occupant of the vehicle;
   a memory accessible by the ECM; and
   a program in the memory, the program being accessible and operable by the ECM to determine a geographical position of the vehicle based on a position input, to determine a vehicle status characteristic based on a vehicle status input, to determine a recommended course of action based on the vehicle status characteristic and the geographical position, to establish an advertisement message in response to the recommended course of action, and to communicate the recommended course of action to the occupant via the message, said message designating a suggestion to obtain a specific commercial brand of merchandise, a suggestion to obtain merchandise from a specific vendor, and a suggestion to obtain a service from a specific merchant.

25. The method of claim 23, wherein; said specific commercial brand of merchandise, said specific vendor, and said specific merchant being dependent on said component brand.

26. The method of claim 25, wherein; said component brand and said specific commercial brand are identical.

27. The action recommendation system of claim 18, wherein; said specific commercial brand of merchandise, said specific vendor, and said specific merchant being dependent on said component brand.

28. The action recommendation system of claim 27, wherein; said component brand and said specific commercial brand are identical.

29. A method of operating a mobile vehicle, comprising:
   determining vehicle status data representative of a characteristic of the vehicle;
   determining a recommended course of action based on the vehicle status data;
   establishing an advertisement message in response to said recommended course of action, the advertisement message including an suggestion to obtain a specific commercial brand of merchandise;
   communicating the recommended course of action to an occupant of the vehicle; in the advertisement message, and
   communicating said advertisement message to said occupant of the vehicle.

30. A method, as set forth in claim 29, wherein said mobile machine includes a plurality of components, said components having a specific brand.

31. A method, as set forth in claim 30, wherein said plurality of components includes an engine, a transmission, an electronic system, a fuel system, and further wherein said vehicle status data is associated with at least one of said plurality of components.

32. A method of operating a mobile machine, comprising:
   determining vehicle status data representative of a characteristic of the vehicle;
   determining a recommended course of action based on the vehicle status data; and
   communicating the recommended course of action to an occupant of the vehicle in an advertisement message, including a suggestion to obtain a merchandise associated with said vehicle status data from a specific vendor.

33. A method, as set forth in claim 32, wherein said mobile machine includes a plurality of components, said components having a specific brand.

34. A method, as set forth in claim 33, wherein said plurality of components includes an engine, a transmission, an electronic system, a fuel system, and further wherein said vehicle status data is associated with at least one of said plurality of components.

35. A method of operating an onboard control module for a mobile machine, comprising:
   determining vehicle status data representative of a characteristic of the vehicle;
   determining a recommended course of action based on the vehicle status data;
   communicating the recommended course of action to an occupant of the vehicle in an advertisement message, including a suggestion to obtain a specific commercial brand of merchandise;
   accessing a database containing resource data representative of one or more of respective locations where the specific commercial brand of merchandise may be acquired; and
   communicating at least one of the respective locations to the occupant of the vehicle.

36. A method, as set forth in claim 35, including automatically determining position data representative of a geographical position of the vehicle, and wherein communicating at least one of the respective locations to the occupant of the vehicle is based on the position data.

37. A method of operating a mobile machine, comprising:

determining vehicle status data representative of a characteristic of the vehicle;

determining a recommended course of action based on the vehicle status data;

establishing an advertisement message in response to said recommended course of action, the advertisement including a suggestion to obtain a specific commercial brand of merchandise from a specific vendor;

communicating the recommended course of action to an occupant of the vehicle;

accessing a database containing resource data representative of one or more of respective locations where the specific commercial brand the merchandise may be acquired;

communication the advertisement message to the occupant of the vehicle; and communicating at least one of the respective locations to the occupant of the vehicle.

38. A method, as set forth in claim 37, including automatically determining position data representative of a geographical position of the vehicle, and wherein communicating at least one of the respective locations to the occupant of the vehicle is based on the position data.

39. A method of operating a mobile vehicle, comprising:

determining a vehicle status data representative of a characteristic of the vehicle;

determining a potential path of said mobile vehicle; and communicating an advertisement message to an occupant of the vehicle in response to said vehicle status and said potential path.

40. A method, as set forth in claim 39, wherein said vehicle status data includes a time of day.

41. A method, as set forth in claim 39, wherein the step of determining said potential path of said mobile machine further comprises the steps of:

determining one of personal data and personal preferences provided by said operator; and determining said potential path in response to said one of said personal data and said personal preferences.

42. A method, as set forth in claim 41, wherein said potential path is a predicted path.

43. A method, as set forth in claim 41, wherein said potential path is a planned path.

44. A method, as set forth in claim 39, wherein said advertisement further includes at least one of a suggestion to obtain a specific commercial brand of merchandise, a suggestion to obtain merchandise from a specific vendor, and a suggestion to obtain a service from a specific merchant.

45. A method, as set forth in claim 39, wherein said advertisement message is associated with at least one of a restaurant and a hotel.

46. A method, as set forth in claim 40, wherein said one of said personal data and said personal preference includes a certain class associated with at least one of a product, a brand, and a service associated with said advertisement.

47. A method, as set forth in claim 39, wherein said vehicle status data includes a physiological feedback.

48. A method, as set forth in claim 39, further comprising the step of determining a recommended course of action in response to said vehicle status, wherein the step of communicating an advertisement message further comprises the step of communicating said advertisement message to an occupant of the machine in response to said recommended course of action and said potential path.

49. A method of operating a mobile vehicle, comprising:

determining a vehicle status data representative of a characteristic of the vehicle;

determining a recommended course of action based on the vehicle status data;

determining a potential path of said mobile vehicle; and communicating an advertisement message to an occupant of the vehicle in response to said recommended course of action and said potential path.

50. A method, as set forth in claim 39, wherein said vehicle status data includes a location of said vehicle.

* * * * *